United States Patent [19]
Cruz-Uribe et al.

[11] 4,369,456
[45] Jan. 18, 1983

[54] CLEANING DEVICE FOR WRITING HEADS USED IN INK JET RECORDERS AND PRINTERS

[75] Inventors: Antonio S. Cruz-Uribe, Cobalt; Peter J. Lewis, Easton; Peter T. Miller, Norwalk, all of Conn.

[73] Assignee: Pitney Bowes Inc., Stamford, Conn.

[21] Appl. No.: 296,668

[22] Filed: Aug. 26, 1981

[51] Int. Cl.³ .............................................. G01D 15/18
[52] U.S. Cl. ................................................. 346/140 R
[58] Field of Search .............. 346/75, 140 R, 140 PD; 239/337, 398, 114, 115

[56] References Cited

U.S. PATENT DOCUMENTS 4,223,322 9/1980 Van Raamsdonk ............ 346/140 R
4,340,897 7/1982 Miller ................................ 346/140 R Primary Examiner—Joseph W. Hartary
Assistant Examiner—Derek S. Jennings
Attorney, Agent, or Firm—Melvin J. Scolnick; Albert Scribner; William Soltow, Jr.

[57] ABSTRACT

An apparatus for use in an ink jet recording device or printer for cleaning or protecting the nozzles in a writing head is disclosed. The apparatus comprises rotatably mounted supply and take-up reels; a movable absorbent cleaning belt extending from the supply reel to the take-up reel, the belt including a plurality of embossed elements and a plurality of openings positioned in sequence along the belt for being brought into contact with the nozzles; and a sensor for sensing the positioning of openings in said belt over said nozzles and thereby controlling movement of the belt to permit the embossed elements to be drawn across the nozzles to clean ink and impurities therefrom until the next openings are positioned over the nozzles whereby the sensors cause the belt to cease movement and permit the ink jet writing heads to print through the openings.

16 Claims, 7 Drawing Figures

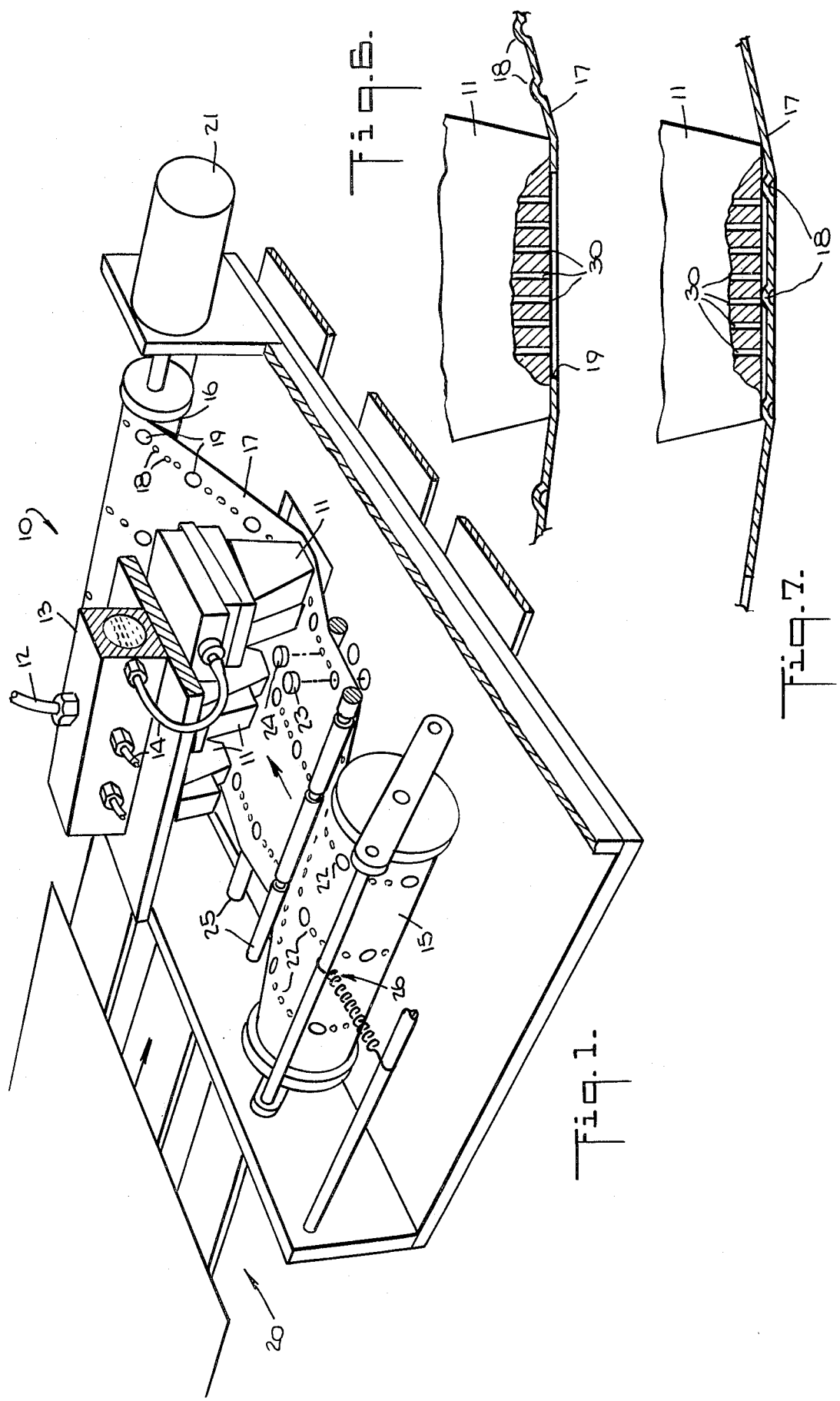

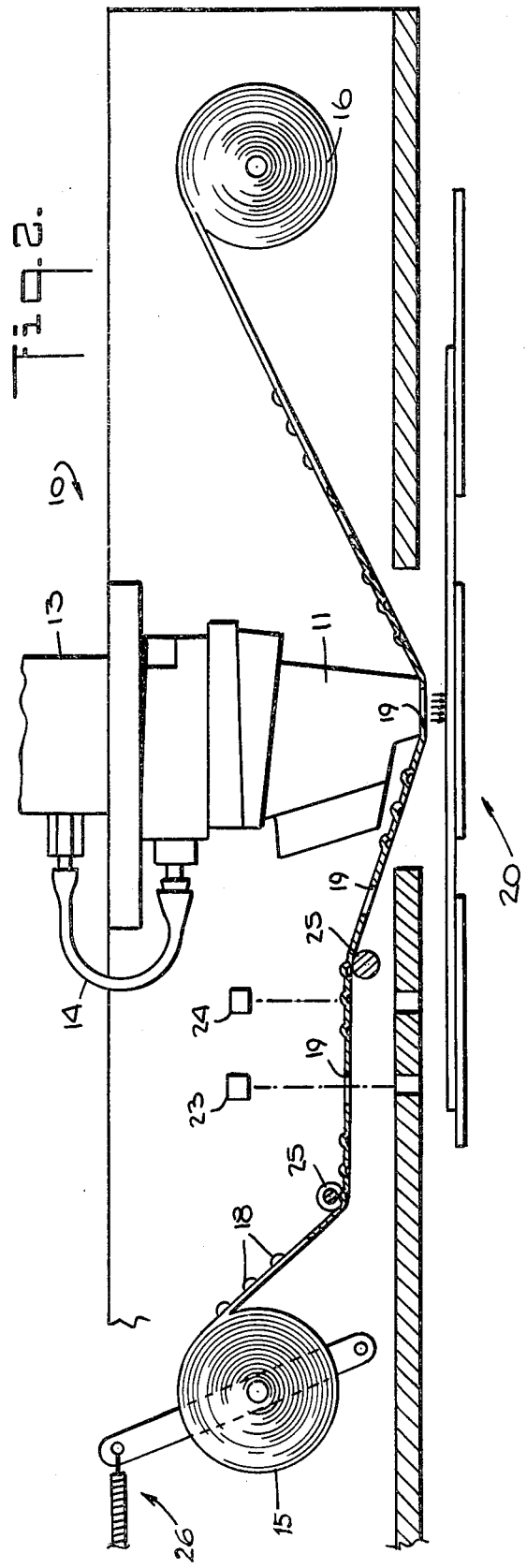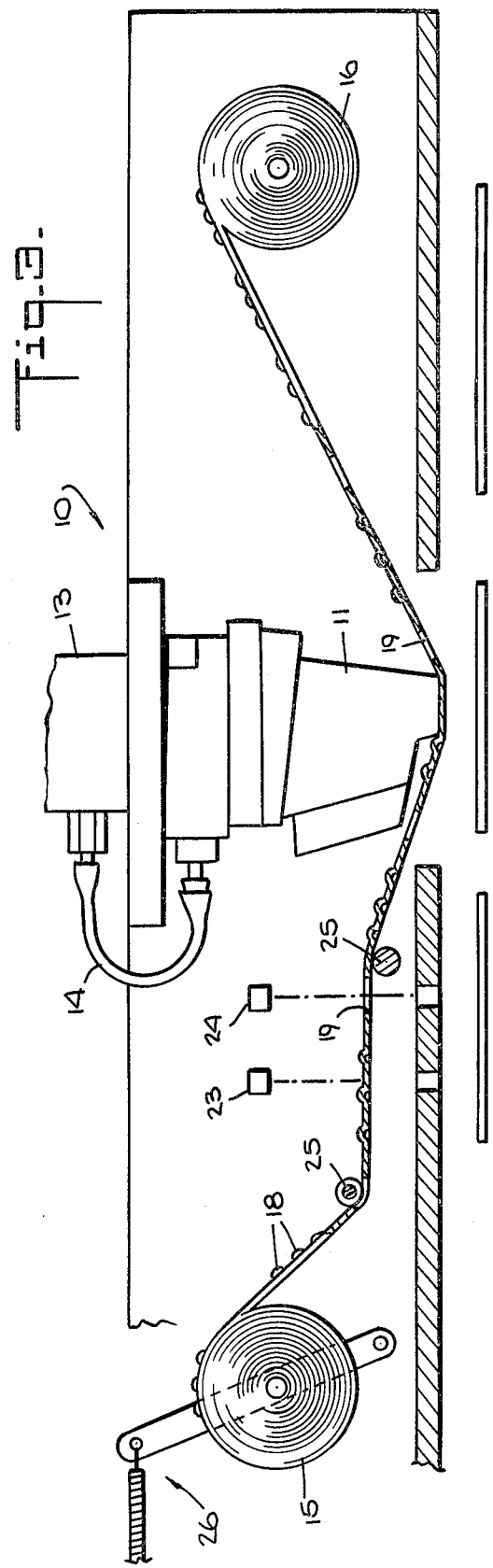

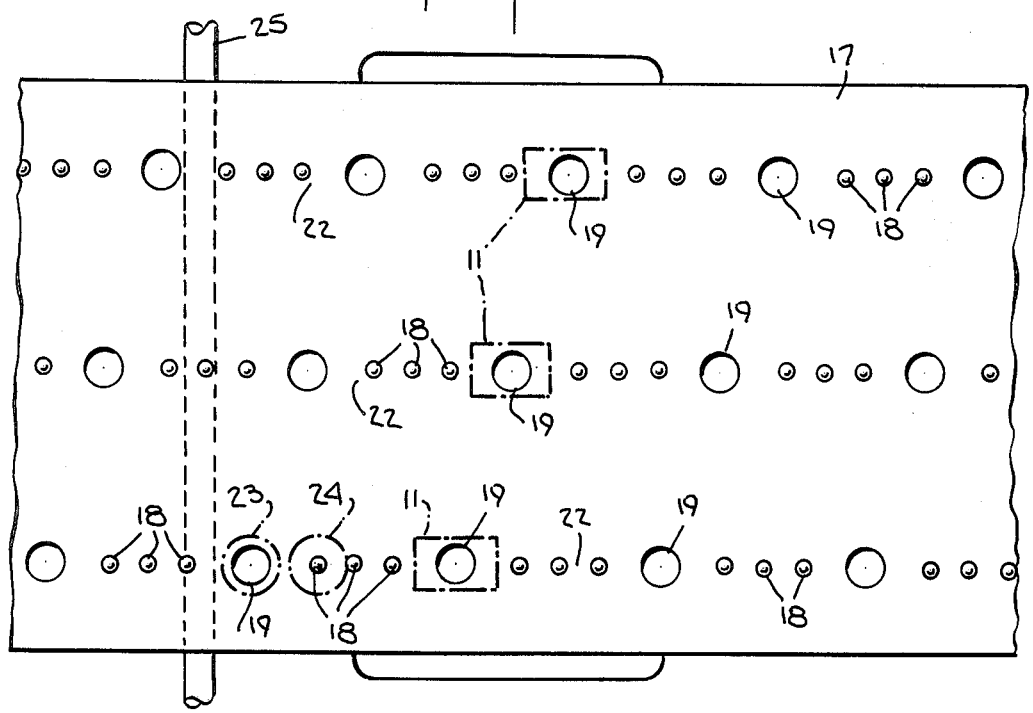
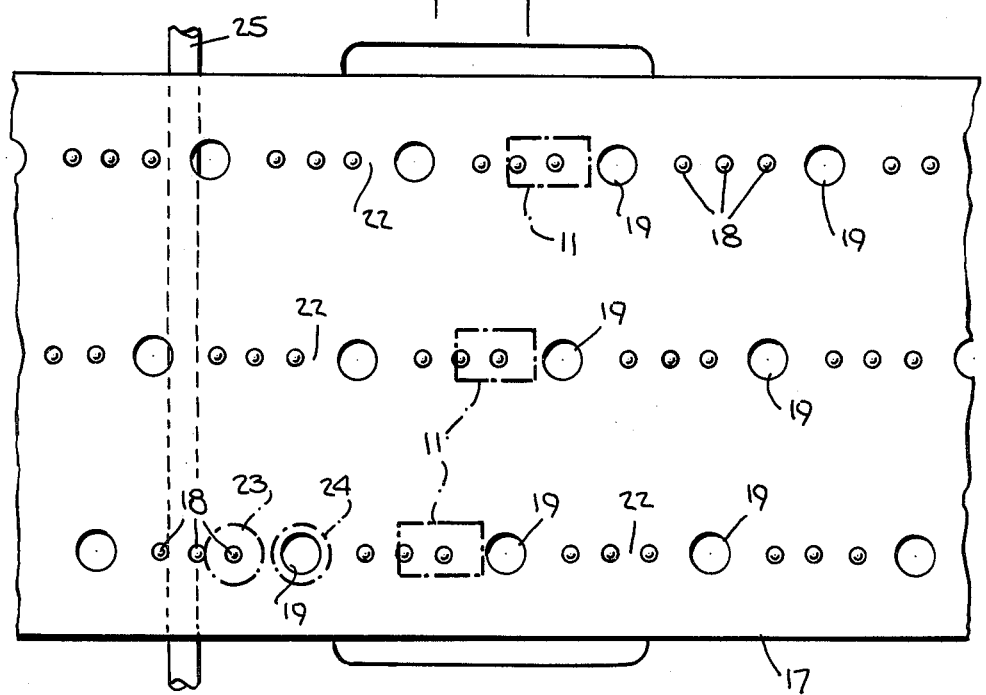

CLEANING DEVICE FOR WRITING HEADS USED IN INK JET RECORDERS AND PRINTERS

BACKGROUND OF THE INVENTION

I. Field of the Invention

This invention relates to a cleaning device, and in particular, to a cleaning device including a cleaning belt for cleaning the writing heads used in ink jet recorders and printers.

II. Statement of the Prior Art

Typically, in an ink jet recorder or printer, the ink is pumped under pressure to a manifold having one or more openings or orifices (nozzles) through which the ink is forced onto a recording surface. For example, in an ink jet printer there is provided a rapid and quiet method of printing with tiny drops of ink. During ink jet printing, the ink drops are ejected from hundreds of nozzles having diameters typically less than 0.003 inches in an ink head which is closely spaced (commonly of the order of 1 to 1.5 mm for impulse ink jets, but larger distances for continuous ink jets) from the record medium on which characters or other information is to be printed. The characters are formed by small ink drops which, depending upon a variety of well-known factors such as the ink and paper, result in varying degrees of printing quality. It is, of course, critical to the proper operation of an ink jet recorder or printer that the nozzles through which the ink passes remain clean and unobstructed. However, it has been found that this is not an easy objective to accomplish. For example, the exit areas of the nozzles on the ink head tend to attract particles or impurities, e.g. paper dust, from the surrounding atmosphere which interfere with the flow of the ink through the nozzles. The ink itself may thicken or completely dry around the nozzles thereby interfering with the formation of perfectly straight ink drop streams flowing from the nozzles. It is also possible that the ink can react with an air component causing dye precipitation, i.e. dye particles precipitate out of the ink. The accumulation of dried ink or atmospheric impurites at the nozzles can also cause the ink jet head to malfunction.

Many different attempts have been made to solve the above outlined problems by either providing various types of cleaning compositions which are added to the ink itself or securing a cleaning device to the ink jet apparatus. For example, U.S. Pat. No. 4,256,610 discloses an aqueous based composition used for removing ink residues and other foreign matter from the nozzles and other fluid areas of an ink jet recording apparatus. U.S. Pat. No. 4,007,465 and 4,050,078 describe various mechanical systems for cleaning ink jet heads.

In U.S. Pat. No. 4,112,435, there is described a mechanical device in the form of a shield and wiper for cleaning ink jet recording devices. The device consists of a shield member mounted on the writing head and movable between a blocking position in front of the nozzles of the writing head and an operating position spaced from and clear of the nozzles. The shield is equipped with a resilient wiping arm which wipes across the face of the writing head during movement between the positions. One problem with this type of device is that it cleans by a squeeze action which can leave a film of ink on the writing head that can interfere with the subsequent firing of the ink jets. It is also possible with this type of squeeze action to draw ink out of the nozzles of the writing head which would add to the ink left behind in the form of a film and therefore further interfere with the firing of the heads. The ink removed by the cleaner described in this patent falls by gravity away from the writing head. This limits using the heads in a horizontal position since to position the heads vertically would allow ink to creep back into the nozzles. Furthermore, removing the excess ink in this manner allows the ink to get on other portions of the machine which is not very desirable. In addition, this type of cleaning device will work primarily on a flat surface. It would therefore require a careful alignment procedure.

U.S. Pat. No. 4,223,322 discloses a device for cleaning an ink writing head in an ink printer. The device includes a liquid absorbing cleaning medium in the form of a movable tape supported between two reels. The tape is brought into contact with the nozzles in the ink writing head to permit ink to flow from the nozzles to the cleaning medium to be absorbed by the medium. In the disclosed device the ink is absorbed onto the cleaning medium with no specific control as to how the ink spreads, i.e., the cleaning medium functions solely as a blotter and does not wipe the nozzles clean. To thereby adequately remove all the ink a large cleaning surface area of non-reusable material is used. This system is further limited in that it cannot be used for cleaning irregularly shaped surfaces. Furthermore, as a cleaner, the device is relatively complicated in design having several moving parts and requires moving the writing heads to perform the cleaning function. It is therefore more prone to failure.

SUMMARY OF THE INVENTION

It is therefore an object of the present invention to overcome many of the disadvantages of cleaning devices typically used for ink jet recorders and printers as described in the prior art, and to provide a cleaning device for cleaning or protecting the nozzles positioned in the writing heads used in ink jet recorders or printers, that is extremely efficient in operation and is able to remove substantially all of the excess ink that one desires to remove from the writing heads to thereby prevent frequent ink clogging of the nozzles and interference with jet firing.

It is a further object of this invention to provide a cleaning device for an ink jet recorder or printer for cleaning the ink jet writing heads that does not require movement of the writing heads or moving any portion of the recorder or printer to clean the writing heads other than a portion of the cleaning device itself.

It is a further object of this invention to provide a cleaning device for an ink jet writing head that will function properly with substantially any shaped writing head, and which conforms to the surface of substantially any writing head simply, easily and substantially without any major effort.

It is a further object of this invention to provide a cleaning device for an ink jet recorder or printer that can function with one or more writing heads that have any orientation.

It is a further object of the present invention to provide a cleaning device for an ink jet writing head that will efficiently remove solid particles, e.g., paper, dust ashes, etc. from the writing head as well as excess ink.

It is still a further object of the present invention to provide a cleaning device for an ink jet writing head that is simple in design, requires fewer moving parts than prior art devices, and is less prone to failure than the cleaning devices known in the prior art.

The foregoing objects and others are accomplished in accordance with the present invention by providing an apparatus for use in an ink jet recording device or printer for cleaning or protecting the nozzles of one or more writing heads, the apparatus including rotatably mounted supply and take-up reels. A movable absorbent cleaning belt extends from the supply reel to the take-up reel. The belt includes a plurality of embossed elements and a plurality of openings both of which are positioned along the belt in sequence for being brought into contact with the nozzles. Included in the system is a sensing means for sensing the positioning of openings in the belt over the nozzles which thereby controls movement of the belt to permit the embossed elements to be drawn across the nozzles to clean ink and impurities therefrom until the next openings along the belt are positioned over the nozzles. At this point, the sensing means causes the belt to stop moving and permits the ink jet writing head to print through the one or more openings depending on the number of writing heads.

In the preferred embodiment of the present invention the cleaning apparatus, as is more fully described hereinbelow, has particular use in an ink jet printing device for cleaning an ink jet writing head having a plurality of nozzles (orifices) therein through which the ink flows. The cleaning apparatus can be employed in an ink jet printing device that employs one or more writing heads.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 1 is a fragmentary isometric view of a cleaning device in accordance with the present invention in an ink jet printing apparatus;

FIG. 2 is a side plan view partly in section of the cleaning device as shown in FIG. 1 illustrating the cleaning belt in a position allowing the device to print;

FIG. 3 is a side plan view partly in section of the cleaning device as shown in FIG. 1 illustrating the cleaning belt in position for cleaning the writing heads;

FIG. 4 is an exploded top plan view of a portion of a cleaning belt in a print position;

FIG. 5 is an exploded top plan view of a portion of a cleaning belt in a position for cleaning the writing heads;

FIG. 6 is an exploded side plan view of a portion of a writing head in contact with the cleaning belt during print position; and FIG. 7 is an exploded side plan view of a portion of a writing head in contact with the cleaning belt during the cleaning cycle.

DESCRIPTION OF THE PREFERRED EMBODIMENTS

Referring now to the drawings, and particularly to FIG. 1 thereof, there is shown in accordance with a preferred embodiment of the present invention a cleaning system 10 for cleaning writing heads 11 as typically used in an ink jet recording device or printer. As shown, ink is supplied to writing heads 11 through an ink supply line 12 which is connected from an ink supply (not shown) to the ink supply manifold 13. Manifold 13 supplies ink to writing heads 11 through ink supply lines 14. The ink supplied to the writing heads is done so under the pressure required for the writing heads to be able to fire ink correctly. The ink is drawn into the writing heads and is formed into jets of ink droplets by electrically actuated pressure transducers in writing heads 11 and the small nozzles in the orifice plates (not shown) located at the bottom portion of each of the writing heads 11 illustrated in FIG. 1 which actually constricts the ink down to produce small drops from jets of ink.

Supported between a rotatable cleaning belt supply roll 15 and take-up roll 16 is a cleaning belt 17. The cleaning belt includes a plurality of embossed elements (dimples) 18 and a plurality of openings 19 that are positioned longitudinally in sequence along the belt at each corresponding location along the belt where there is positioned a writing head 11. Thus, as shown in the embodiment illustrated in FIG. 1, a printer employing three writing heads, employs a cleaning belt 17 containing three longitudinal rows of embossed elements 18 and openings 19, each row being positioned in sequence in a path that will travel directly under each of writing heads 11. This arrangement helps to achieve a primary objective of the cleaning system in accordance with the present invention, i.e., it is not necessary to move any of the ink jet writing heads 11 or the envelope transport system 20 in order to clean the writing heads, to wipe them off, or to purge the system. When the ink jet apparatus is set for printing (see FIGS. 2, 4, and 6) openings 19 in the cleaning belt are lined up with the bottom portion of each of writing heads 11. In this position the writing heads can print directly through openings 19 without any interference. At some time during the printing process it may be necessary to perform a cleaning operation on the writing heads. Cleaning of nozzles 30 is accomplished by the flow of ink out of the nozzles caused by capillary wicking. When the cleaning belt is acting as a protective shield (printer is in the stand-by or shut-down mode), it is this constant slow wicking which will prevent the ink from drying and interfering with subsequent jet firing. The outward flow of ink into the absorbent material forming the belt during the wiping or cap action of the belt also prevents air from entering nozzles 30 and thereby prevents the formation of microscopic air bubbles in the nozzles. Cleaning of the face of writing heads 11, i.e., the orifice plate, is accomplished by a wiping action. When such a cleaning step is required motor 21 is actuated (either by the operator or automatically) to drive take-up reel 16, thereby moving cleaning belt 17 in a forward direction as shown by arrow 22. The belt is advanced such that the embossed elements 18 on the cleaning belt brush over nozzles 30 in the writing heads and wipe them clean of any debris. These embossed elements provide a positive raised surface that presses against the face of each of the writing heads and thereby assures that each head is wiped clean. As belt 17 advances forward onto take-up reel 16 during this cleaning process, the next opening 19 in sequence located in the row directly under the sensors lines up with first sensor 23, preferably an optical sensor, that senses light that is transmitted through opening 19 as this opening is positioned directly beneath the sensor. Both the first sensor 23 and a second sensor 24 transmit signals to a control device (not shown) in a manner as more fully described hereinbelow. These signals indicate to the control device whether or not writing heads 11 are positioned over an opening 19 in the cleaning belt, and thereby indicate whether or not the printing system is in a printing mode. As shown in FIG. 1 there is also provided guide rollers 25 on either side of sensors 23 and 24 to help control the position of cleaning belt 17, i.e. to keep the belt within a singular plane. This is done so as to avoid focusing problems with the sensors. Supply roll 15 includes a small friction clutch (not shown) and is pulled back by a spring device 26, both of which provide a constant tension in cleaning belt 17 as it moves foward to writing heads 11.

In the printing mode, the bottom surfaces of each of writing heads 11 are lined up with openings 19 in the cleaning belt 17. At the same time, because of the sequence arrangement of the openings and embossed elements 18 along the cleaning belt in each of the rows 22, another one of these openings is lined up with first optical sensor 23. This sensor preferably comprises a light emitting diode or some other source of light, and a phototransistor system set up in a manner which permits light from the light source to pass through the opening in the cleaning belt and reach sensor 23 below it. At this same time, the second sensor 24 will be in the off mode. The light from its light source will be striking cleaning belt 17 which thereby blocks the light from reaching the phototransistor system for sensor 24. In a cleaning mode second sensor 24 receives light and transmits a signal to motor 21 to move cleaning belt 17. Openings 19 and embossed elements 18 are at regularly spaced intervals along belt 17 in one or more longitudinal rows (one for each writing head 11), and are sequenced such that the optical sensors will be positioned over an opening that is two or three openings behind the opening which lines up with the bottom portions of each of the ink jet writing heads.

A specific example of how a cleaning apparatus in accordance with the present invention operates in an ink jet printing system, such as the system illustrated in FIG. 1, is as follows: While the system is printing (printing mode), cleaning belt 17 is in the printing position, i.e., first sensor 23 is lined up with an opening 19 in the belt as shown in FIG. 1. Due to the sequence positioning of the openings along the belt, when sensor 23 is over an opening, there is an opening 19 lined up with the bottom portions of each of the writing heads 11 permitting printing to occur through these openings (FIGS. 2, 4, and 6). While the machine is in operation, and after some period of time has passed, print quality may become poor due to clogging of one or more of the jet nozzles 30, air bubbles, or debris on the face of any of the jet nozzles. During the printing mode, belt 17 is stationary, belt driving motor 21 is in an off position, and first sensor 23 transmits signals to the control portion of the printing apparatus that the belt is stationary, and positioned correctly for printing. Once print quality becomes poor, the operator, for example can initiate the cleaning operation by pressing a specific button located on the machine indicating that a purge or a wipe was desired. Thereafter the control circuitry in the apparatus would take over to perform the desired function. The apparatus could also contain an automatic cleaning control that would automatically start the cleaning system when a purge or wipe was required. If just a wipe of writing heads 11 is desired, the control circuitry would turn motor 21 on, and advance belt 17 such that embossed elements 18 would wipe clean the bottom portions of each of the ink jet writing heads (FIG. 2, 5 and 7). Sensor 23 would monitor belt 17 until the next opening in sequence arrives under the first sensor. At this point, light passes through the opening under sensor 23 turning the corresponding phototransistor on, and thereby sending a signal to the apparatus to turn off motor 21. Thereafter, normal printing can resume by firing the ink jets through the opening in the belt that is then located directly beneath the writing heads. If it is desired to purge the heads because, for example, there is an air bubble in one or more of nozzles 30, then the apparatus would, upon the operator pressing the purge button, advance belt 17 until the second sensor 24 was lined up with the first available hole in sequence, thus stopping the belt from further movement. In this belt position the solid portion of the belt with embossed elements 18 would be positioned beneath each of the writing heads. Thereafter, a high pressure pump (not shown) positioned in the ink supply system of the apparatus feeds higher pressure ink to each of writing heads 11 forcing ink through jet nozzles 30 and thereby expelling any air bubbles or debris out of the nozzles or adjacent ink channels. The excess expelled with the bubbles or debris would be absorbed into the belt. At the end of the purge cycle motor 21 would be automatically turned on, and the belt would advance one opening past first sensor 23, to the next opening in the sequence. Of course, during this belt movement, the bottom portions of each of the heads are wiped clean. When the next opening is lined up with first sensor 23, then motor 21 is turned off, belt 17 would be stationary, an opening 19 would be lined up with the bottom portions of each of the ink jet writing heads 11, and printing can continue.

FIGS. 2, 5, and 7 illustrate belt 17 in either the wiping mode (cleaning) if the belt is moving, or in the parked mode (cap mode) if the belt is stationary. The cap mode is the position used when the apparatus is not in operation or in the stand-by condition. Under both of these conditions (cleaning and cap mode) the belt is pulled up fairly tightly against the surface of writing heads 11. Ink will wick out of nozzles 30 and capillarily soak into the cleaning belt keeping that area directly in contact with the nozzles moist. During the cap mode, the belt acts as a protective shield for the nozzles and the orifice plate.

In accordance with the preferred embodiments of the present invention, cleaning belt 17 is preferably made from an absorbent material, such as a filter paper. One basic disadvantage with filter paper materials is that when they are wet, they lose their strength and tear very easily. To avoid this problem, it is preferred to use a belt formed of a filter paper having a coating, e.g. a plastic coating such as polyethylene, on the surface of the belt opposite to the writing heads. The plastic coating helps to stiffen the belt and thereby preserve the integrity of the embossed elements. In accordance with the present invention, the belt can be made of any material (1) that possesses fairly good absorption properties, (2) will not damage the writing heads during a wiping procedure, and (3) which can also be formed into the type of belt described herein.

The cleaning apparatus in accordance with the present invention can be used in any ink jet recording or printing apparatus that employs one or a plurality of writing heads, such as the ink jet system illustrated in FIG. 1.

While this invention has been described in conjunction with specific embodiments thereof, it is evident that many alternatives, modifications and variations will be apparent to those skilled in the art. Accordingly, the present invention is intended to embrace all such alternatives, modifications and variations, and fall within the spirit and scope of the appended claims.

We claim:

1. An apparatus for use in the ink jet recording device or printer for cleaning or protecting the nozzle openings positioned in at least one writing head, said apparatus comprising:
   rotatably mounted supply and take-up reels;
   a movable absorbent cleaning belt extending from the supply reel to the take-up reel, said belt including a plurality of embossed elements and a plurality of openings positioned in sequence along the belt for being brought into contact with the bottom portion of said writing heads; and
   sensing means for sensing the positioning of openings in said belt over said nozzles and thereby controlling movement of said belt to permit said embossed elements to be drawn across said nozzles to clean ink and impurities therefrom until the next openings along the belt are positioned over said nozzles whereby the sensing means causes the belt to cease movement and permit said ink jet writing heads to print through said openings.

2. An apparatus according to claim 1 wherein said sensing means includes a first and a second sensor.

3. An apparatus according to claim 2 wherein said sensors are optical sensors.

4. An apparatus according to claim 2 wherein said first sensor controls the cleaning cycle of the ink jet device.

5. An apparatus according to claim 2 wherein said second sensor controls the purging cycle of the ink jet device.

6. An apparatus according to claim 1 wherein said absorbent cleaning belt is formed of a laminated filter paper.

7. An apparatus according to claim 1 wherein said embossed elements and said openings extend in a row longitudinally along said belt.

8. In an ink jet printer having a plurality of ink jet writing heads each of said heads having a plurality of nozzles through which ink flows, an apparatus for cleaning each of said writing heads comprising:
   rotatably mounted supply and take-up reels;
   a movable absorbent cleaning belt extending from the supply reel to the take-up reel, said belt having spaced thereon and positioned to contact each of said writing heads, a plurality of rows of embossed elements and openings positioned in sequence along each of the rows for being brought into contact with the bottom portion of said writing heads; and
   sensing means for sensing the positioning of openings in said belt over said nozzles and thereby controlling movement of said belt to permit said embossed elements in each of said rows to be drawn across said nozzles to clean ink and impurities therefrom until the next series of openings along the belt is positioned over said nozzles whereby the sensing means causes the belt to cease movement and permit said ink jet writing heads to print through said openings.

9. An apparatus according to claim 8 wherein said belt includes one of said rows of embossed elements and openings for each of said writing heads.

10. An apparatus according to claim 8 wherein said rows of embossed elements and openings extend longitudinally along the belt.

11. An apparatus according to claim 8 wherein said sensing means includes a first and a second sensor.

12. An apparatus according to claim 11 wherein said sensors are optical sensors.

13. An apparatus according to claim 11 wherein said first sensor controls the cleaning cycle of the ink jet printer.

14. An apparatus according to claim 11 wherein said second sensor controls the purging cycle of the ink jet printer.

15. An apparatus according to claim 8 wherein said absorbent cleaning belt is formed of a filter paper.

16. An apparatus according to claim 8 wherein said printer is an ink jet addresser.

* * * * *